US 8,644,820 B2

(12) United States Patent
Liu

(10) Patent No.: US 8,644,820 B2
(45) Date of Patent: Feb. 4, 2014

(54) APPARATUS AND METHOD FOR ACQUIRING SERVICE INFORMATION IN WIRELESS NETWORK

(75) Inventor: Yong Liu, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1188 days.

(21) Appl. No.: 11/802,151

(22) Filed: May 21, 2007

(65) Prior Publication Data

US 2008/0113652 A1 May 15, 2008

Related U.S. Application Data

(60) Provisional application No. 60/858,342, filed on Nov. 13, 2006.

(30) Foreign Application Priority Data

Jan. 24, 2007 (KR) .................. 10-2007-0007441

(51) Int. Cl.
*H04W 4/00* (2009.01)
*H04B 7/00* (2006.01)
*H04M 1/00* (2006.01)
*H04M 3/00* (2006.01)

(52) U.S. Cl.
USPC ............. 455/432.3; 455/41.2; 455/556.1; 455/420; 370/338

(58) Field of Classification Search
USPC ............ 455/432.5, 41.2, 556.1, 432.3, 420; 370/338, 466, 352; 709/223, 230
See application file for complete search history.

(56) References Cited

U.S. PATENT DOCUMENTS

| 5,341,477 | A  | * | 8/1994  | Pitkin et al. ............... 709/226 |
| 2002/0152226 | A1 | * | 10/2002 | Burnett .................... 707/200 |
| 2003/0054794 | A1 | * | 3/2003  | Zhang ..................... 455/403 |
| 2003/0096633 | A1 | * | 5/2003  | Goldberg .................. 455/556 |
| 2003/0114148 | A1 | * | 6/2003  | Albertsson et al. ........... 455/414 |
| 2004/0042434 | A1 | * | 3/2004  | Kennedy .................. 370/338 |
| 2004/0048613 | A1 | * | 3/2004  | Sayers et al. ............. 455/426.2 |
| 2004/0203455 | A1 | * | 10/2004 | Bao et al. ................ 455/67.13 |
| 2005/0163118 | A1 |   | 7/2005  | Steindl |
| 2005/0193106 | A1 | * | 9/2005  | Desai et al. ............... 709/223 |
| 2006/0088020 | A1 |   | 4/2006  | Gass |
| 2006/0120297 | A1 |   | 6/2006  | Hamedi et al. |

(Continued)

FOREIGN PATENT DOCUMENTS

EP   1 589 721         10/2005
KR   2002067720 A  *   8/2002

OTHER PUBLICATIONS

Motorola Wireless Software Application and Service, "Java APIs for Bluetooth Wireless Technology", Apr. 2002, Specification Version 1.0a, p. 23.*

(Continued)

*Primary Examiner* — Opiribo Georgewill
(74) *Attorney, Agent, or Firm* — NSIP Law

(57) ABSTRACT

A service list acquisition apparatus is provided for acquiring, from at least one service list provision apparatus located in a wireless network coverage area, a service list related to a wireless network which can embody a portion where a service list is exchanged with the service list provision apparatus in a layer lower than an Internet protocol (IP) layer, thereby acquiring the service list without an additional IP address allocation procedure.

23 Claims, 15 Drawing Sheets

(56) References Cited

U.S. PATENT DOCUMENTS

| | | | |
|---|---|---|---|
| 2007/0043970 A1* | 2/2007 | Solomita et al. | 714/10 |
| 2007/0104160 A1* | 5/2007 | Ho | 370/338 |
| 2007/0141988 A1* | 6/2007 | Kuehnel et al. | 455/41.2 |

OTHER PUBLICATIONS

Tyan et al., "A comprehensive service discovery solution for mobile ad hoc networks", Mobile Networks and Applications, vol. 10, Issue 4, Aug. 2005.*

* cited by examiner

APPARATUS AND METHOD FOR ACQUIRING SERVICE INFORMATION IN WIRELESS NETWORK

CROSS-REFERENCE TO RELATED APPLICATIONS

This application claims the benefit under 35 U.S.C. §119(e) of a U.S. Provisional Application No. 60/858,342, filed on Nov. 13, 2006, in the U.S. Patent and Trademark Office, and under 35 U.S.C. §119(a) of a Korean Patent Application No. 10-2007-0007441, filed on Jan. 24, 2007, in the Korean Intellectual Property Office, the entire disclosures of both are hereby incorporated by reference.

BACKGROUND OF THE INVENTION

1. Field of the Invention

The present invention relates to an apparatus and method of transceiving a service list which a wireless network provides to at least one terminal located in a wireless network coverage area. More particularly, the present invention relates to an apparatus and method of transmitting, in a data link, a service list without Internet protocol (IP) address allocation.

2. Description of Related Art

Currently, various services such as simple voice communication, image communication, data communication, instant messaging, movie viewing, web services, games, and the like, are portably used due to remarkable development of wireless networks. In particular, the development of wireless networks enables the services to be used at a low price.

However, it is required that a mobile communication terminal should first be connected to a mobile communication network, so that the mobile communication terminal may use the services, and a service type which the mobile communication network provides should also be checked. Since a service discovery module existing at the same layer or at a higher layer than a network layer should directly control message transmission, for checking a service list during the above-described process, a procedure in which an Internet protocol (IP) address is allocated in the network layer is required for service discovery.

An IP address allocation procedure for receiving a service list is problematic in that unnecessary traffic in a network is generated and the power of a terminal is consumed.

Also, a Link Layer Discovery Protocol (LLDP), approved as a standard in Institute of Electrical and Electronics Engineers (IEEE) 802.1AB, is a simple protocol for periodically informing to each device a case where a device such as a new router, a terminal, and the like, are installed in a wireless network, and where a network type is changed or a resource is changed.

Since the LLDP is operated in a link layer, compared with a case where a protocol performing a similar function such as a Cisco Discovery Protocol (CDP), a Simple Service Discovery Protocol (SSDP), and the like is operated in the same layer or in a layer higher than an IP layer, the LLDP has an advantage of not requiring IP address allocation during a message exchange process for discovery and the like.

FIG. 1 is a diagram illustrating a process in which a service list acquisition apparatus 100, according to the related art, controls each element in order to acquire a service list. As illustrated in FIG. 1, the service list acquisition apparatus 100 includes an application program unit 110, a middleware unit 120, a service discovery module 130, a network layer 140, a data link layer 150, and a physical layer 160. Hereinafter, referring to FIG. 1, a function for each element is described in detail.

When a user of the service list acquisition apparatus 100 intends to use a service such as a game service, a video on demand (VOD) service, and the like, via a wireless network, the user operates the specific application program unit 110 and the application program unit 110 inquires of the middleware unit 120, which performs a communication with the wireless network, whether the wireless network provides the specific service.

The middleware unit 120 checks whether the specific service list exists in the service discovery module 130 existing in the middleware unit 120. When the specific service list exists, the middleware unit 120 performs a communication for using the specific service connecting with the wireless network.

When the specific service list does not exist or a service list with respect to any service which the wireless network provides does not exist as a result of the checking of the middleware unit 120, the service discovery module 130 starts a procedure for acquiring the service list.

The service discovery module 130 accesses an external service list provision apparatus successively controlling the network layer 140, the data link layer 150, and the physical layer 160.

During the above-described process, the physical layer 160 transceives a user's data, which is transmitted via a communication channel, modulating and demodulating the user's data into corresponding signals. Also, the data link layer 150 corrects an error generated during a transmission process in the physical layer 160 and designates a physical address corresponding to a Media Access Control (MAC) address for actually transceiving data with a counterpart. Also, the network layer 140 designates a logical address corresponding to an IP address for transceiving data with a counterpart.

Accordingly, the IP address should be allocated in the network layer 140 so that the service list acquisition apparatus 100 may acquire the service list according to a request of the service discovery module 130.

FIG. 2 is a diagram illustrating a service list acquisition process according to the related art. As illustrated in FIG. 2, the service list acquisition process includes step 230 in which a service list acquisition apparatus 220 receives a beacon signal of a service list provision apparatus 210, step 240 in which the service list acquisition apparatus 220 connects with the service list provision apparatus 210, step 250 in which an IP address is allocated to the service list acquisition apparatus 220, and step 260 in which the service list acquisition apparatus 220 receives a service list which a network provides from the service list provision apparatus 210. Hereinafter, referring to FIG. 2, a function for each step is described in detail.

The service list acquisition apparatus 220 receives a beacon signal, which the service list provision apparatus 210 transmits, in order to check a wireless network coverage area providing a service in step 230. When the beacon signal is not received, attempted service usage is abandoned since the service list acquisition apparatus 220 is out of the wireless network coverage area. When the beacon signal is received, a connection for receiving information from the wireless network that the service list acquisition apparatus 220 exists is attempted in order to use the service from the wireless network in step 240.

An IP address is allocated to the service list acquisition apparatus 220 using a Dynamic Host Configuration Protocol (DHCP) via the service list provision apparatus 210 from the wireless network in step 250. When a communication with the service list provision apparatus 210 is possible using the IP address, the service list is finally transmitted in step 260.

FIG. 3 is a diagram illustrating a network type and a resource change state being exchanged between each element of a network using an LLDP according to the related art.

When each element 310, 320, 330, and 340 configuring a network is connected with the network, network type information such as a port number and the like connected with a device identifier of each element and the network using the LLDP is exchanged between adjacent elements. Each element may identify which element in another network is connected with each element and how the information is exchanged with the element based on the information. Since the network identification information is periodically transmitted to the adjacent element by each element, each element may check for a network change by analyzing type information transmitted from the adjacent element. According to an example in FIG. 3, an IP phone 310 and a switch 330 exchange network type information, e.g. "I'm a switch" and "I'm an IP-Phone", to each other, and the exchanged information may be stored in a management information storing unit corresponding to a management information base (MIB) and be constantly maintained.

FIG. 4 is a diagram illustrating a structure of an LLDP agent 400 for exchanging actual information between adjacent devices in a conventional LLDP according to the related art. As illustrated in FIG. 4, the LLDP agent 400 includes a device information storing unit 410 corresponding to an LLDP local system MIB, a remote device information storing unit 420 corresponding to an LLDP remote systems MIB, an extended device information storing unit 430 corresponding to an organizationally defined local device LLDP MIB extension, and an extended remote device information storing unit 440 corresponding to an organizationally defined remote device LLDP MIB extensions. Hereinafter, referring to FIG. 4, a function for each element is described in detail.

A port number connected with a device identifier of a corresponding network element, a description with respect to each port, management information, and the like, are stored in the device information storing unit 410. Also, a device identifier with respect to another device connected to the network configuration device via a connected port number, a description with respect to each port, management information, and the like, are stored in the remote device information storing unit 420.

The extended device information storing unit 430 stores physical layer connection information of the corresponding network element, and the like, and the extended remote device information storing unit 440 stores physical layer connection information with respect to another device connected to the network configuration device, and the like.

The LLDP agent 400 manages information stored in the storing units that are controlled by a service discovery module existing in an upper layer of a protocol stack. The LLDP agent also reports the information to the service discovery module transmitting the information to an external apparatus or updates the information transmitted by the external apparatus.

However, the above-described LLDP agent 400 merely transmits a device identifier of a corresponding device and a resource change state to an adjacent device, and may not transmit information of the corresponding device to a long-distance device via the adjacent device and may not be used for service list transmission in a mobile communication environment.

Accordingly, there is a need for an improved new technology for easily exchanging a service list by a convenient procedure between a service list acquisition apparatus, a service list provision apparatus, and a service list forwarding apparatus extending an agent of an LLDP for exchanging system information in a link layer of a conventional wireless network apparatus and using the LLDP.

SUMMARY OF THE INVENTION

Exemplary embodiments of the present invention address at least the above problems and/or disadvantages and provide at least the advantages described below. Accordingly, an aspect of exemplary embodiments of the present invention is to provide a method and apparatus for transceiving a message for receiving a service list which a wireless network provides in a wireless network environment, without completing an Internet protocol (IP) address allocation process, and easily transmitting the service list which the wireless network provides.

An aspect of exemplary embodiments of the present invention also provides an apparatus and method of transceiving a service list, which a wireless network provides, that can add an element to a Link Layer Discovery Protocol (LLDP) agent existing in a link layer, and by which the LLDP agent can be directly controlled in an upper layer.

An aspect of exemplary embodiments of the present invention also provides an apparatus and method of transceiving a service list, which a wireless network provides, that can directly transmit to a service list provision apparatus a request from a terminal to receive a service list which a wireless network provides or forwards the request to another service list request forwarding apparatus.

According to an aspect of exemplary embodiments of the present invention, there is provided a service list acquisition apparatus for acquiring, from at least one terminal located in a wireless network coverage area, a service list which a wireless network provides, the apparatus including a service list requesting unit for transmitting a service list request to a terminal, a service list receiving unit for receiving a service list from the terminal, and a connection determining unit for determining whether the wireless network is connected based on the received service list.

According to another aspect of exemplary embodiments of the present invention, there is provided a service list provision apparatus for providing, from at least one terminal located in a wireless network coverage area, a service list which a wireless network provides, the apparatus including a database for storing the service list, a service list request receiving unit for receiving a service list request from a terminal, and a service list transmitting unit for identifying, from the database, the service list corresponding to the service list request and transmitting the identified service list to the terminal.

According to still another aspect of exemplary embodiments of the present invention, there is provided a service list provision apparatus for providing, from at least one terminal located in a wireless network coverage area, a service list which a wireless network provides, further including a forwarding transmitting unit for transmitting a received forwarding request to a second terminal, and a service list receiving unit for receiving the service list from the second terminal, wherein the service list request receiving unit receives the forwarding request with respect to the service list request from the terminal and the service list provision apparatus.

According to yet another aspect of exemplary embodiments of the present invention, there is provided a service list acquisition method for acquiring, from at least one terminal located in a wireless network coverage area, a service list which a wireless network provides, the method including transmitting a service list request to a terminal, receiving the service list from the terminal, and determining whether to connect with the wireless network based on the received service list.

According to another aspect of exemplary embodiments of the present invention, there is provided a service list provision method for providing, from at least one terminal located in a wireless network coverage area, a service list which a wireless network provides, the method including storing and maintaining the service list in a database, receiving a service list request from a terminal, and identifying, from the database, the service list corresponding to the service list request and transmitting the identified service list to the terminal.

According to exemplary embodiments of the present invention, it is possible to improve efficiency of an entire network without generating unnecessary network traffic for allocating an IP address.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
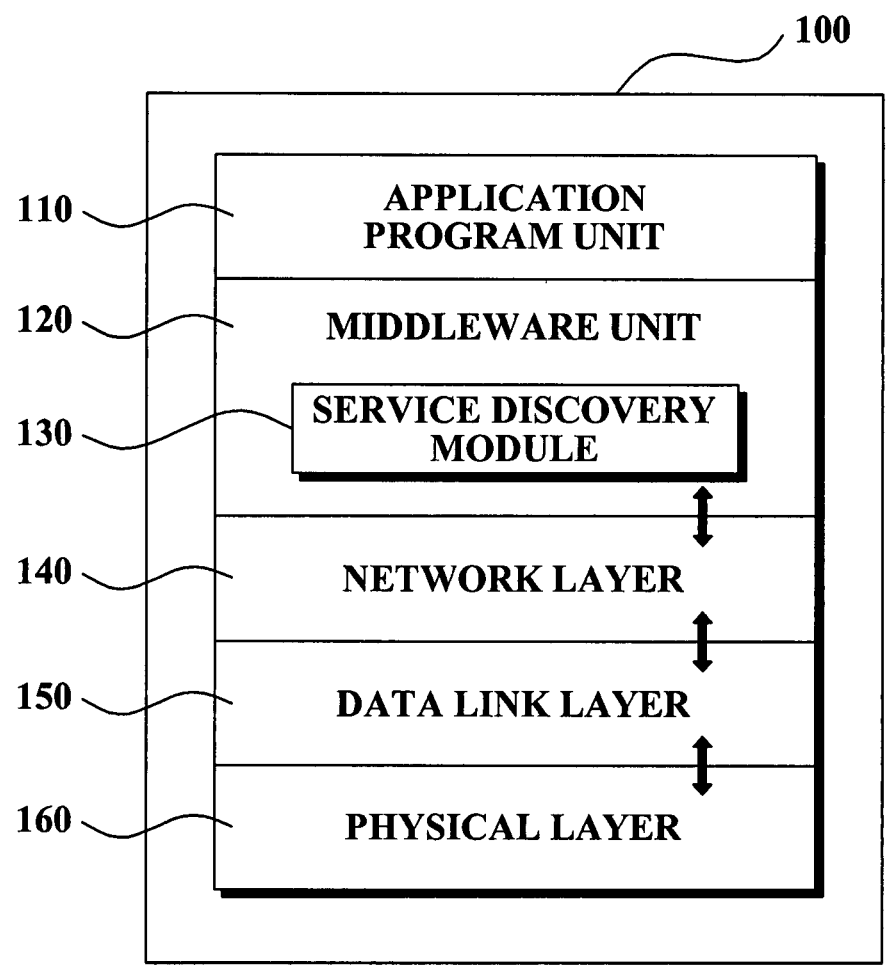
FIG. 1 is a diagram illustrating a structure of an apparatus for acquiring and transmitting a service list according to the related art.
Figure 2:
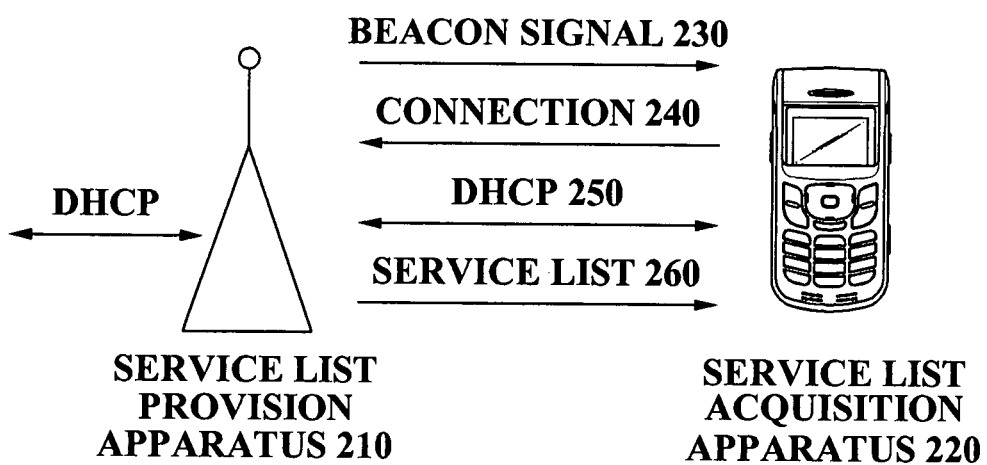
FIG. 2 is a diagram illustrating a process of exchanging a message with a service list provision apparatus so that an Internet protocol (IP) address may be first allocated as a prior procedure for receiving a service list according to the related art.
Figure 3:
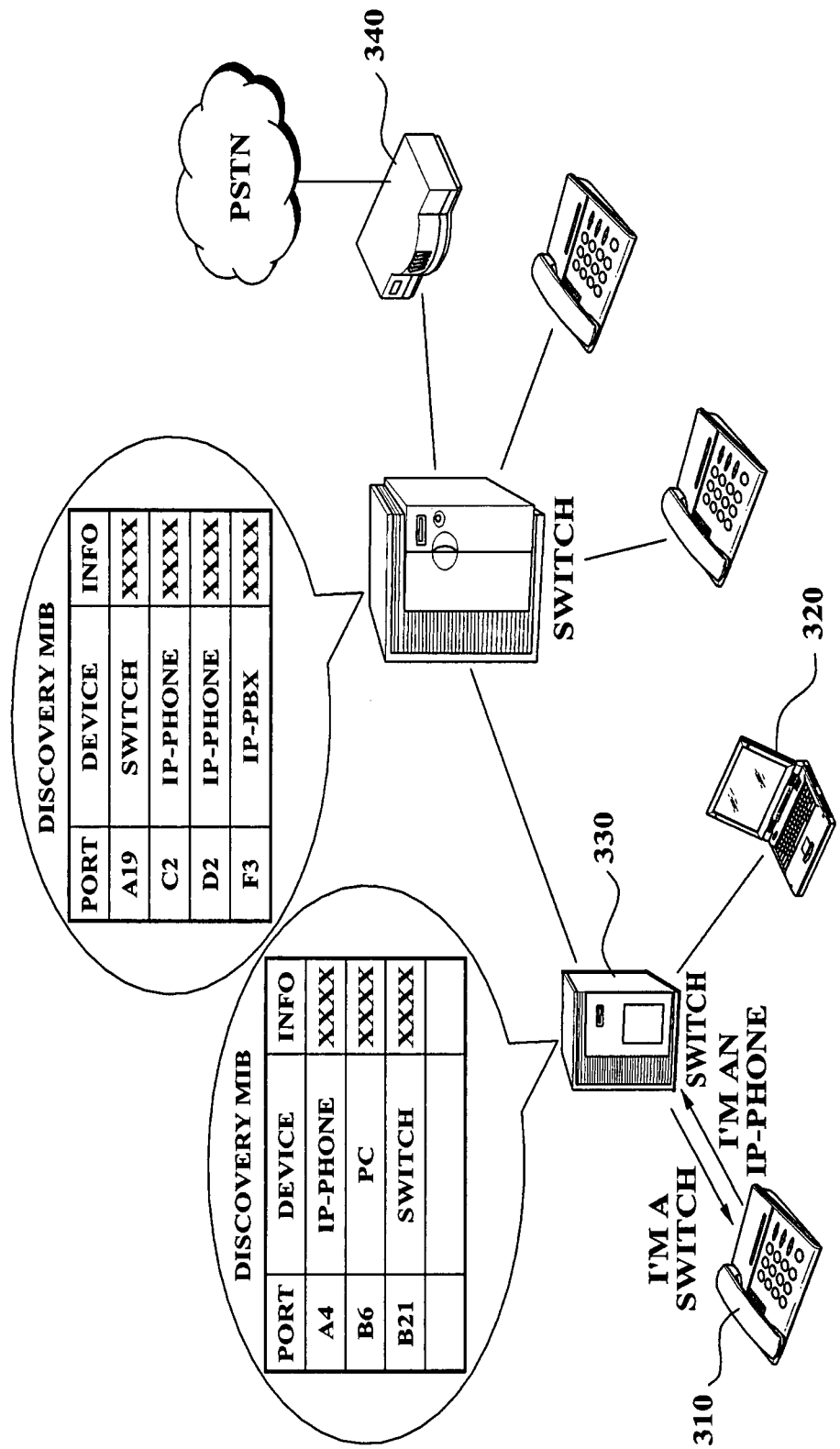
FIG. 3 is a diagram illustrating that information such as each identifier, an apparatus type, and the like, is exchanged between each element of a network using a Link Layer Discovery Protocol (LLDP) according to the related art.
Figure 4:
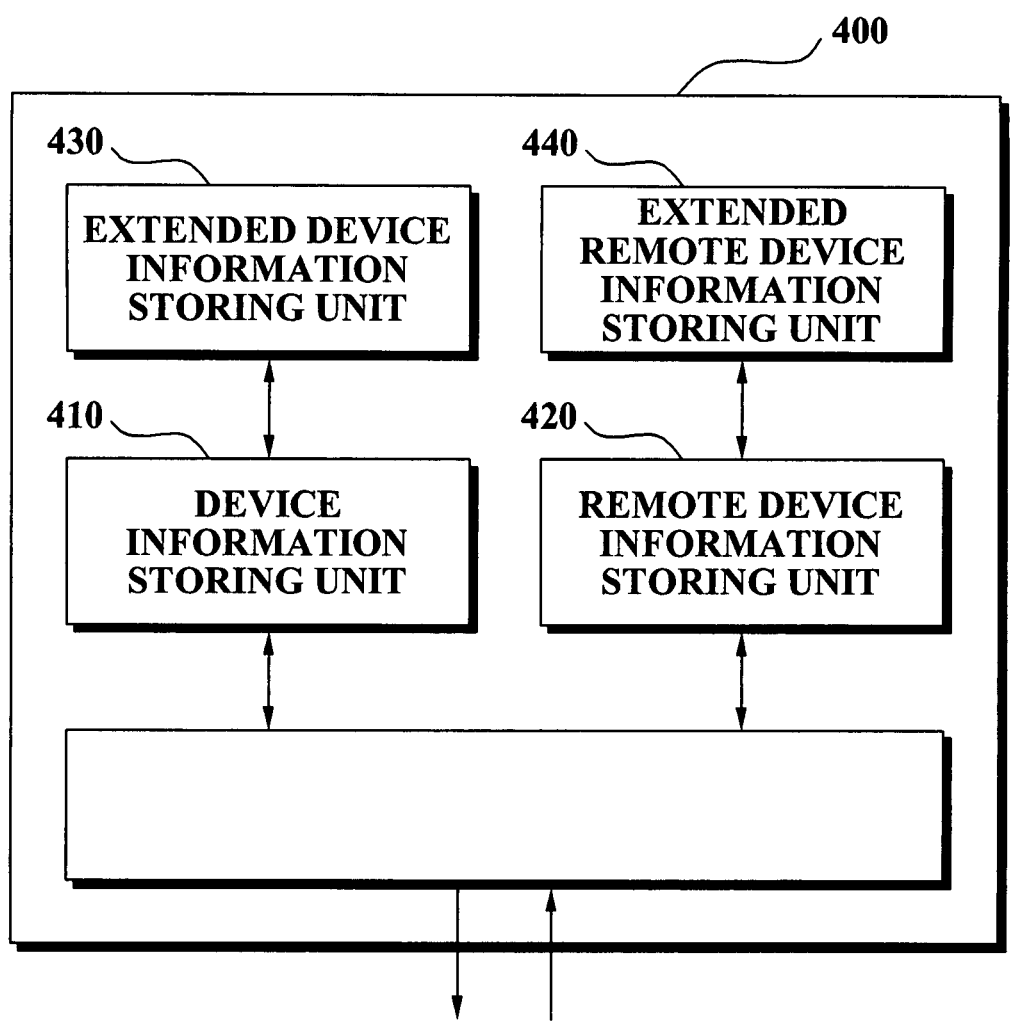
FIG. 4 is a diagram illustrating a structure of an LLDP agent according to the related art.
Figure 5:
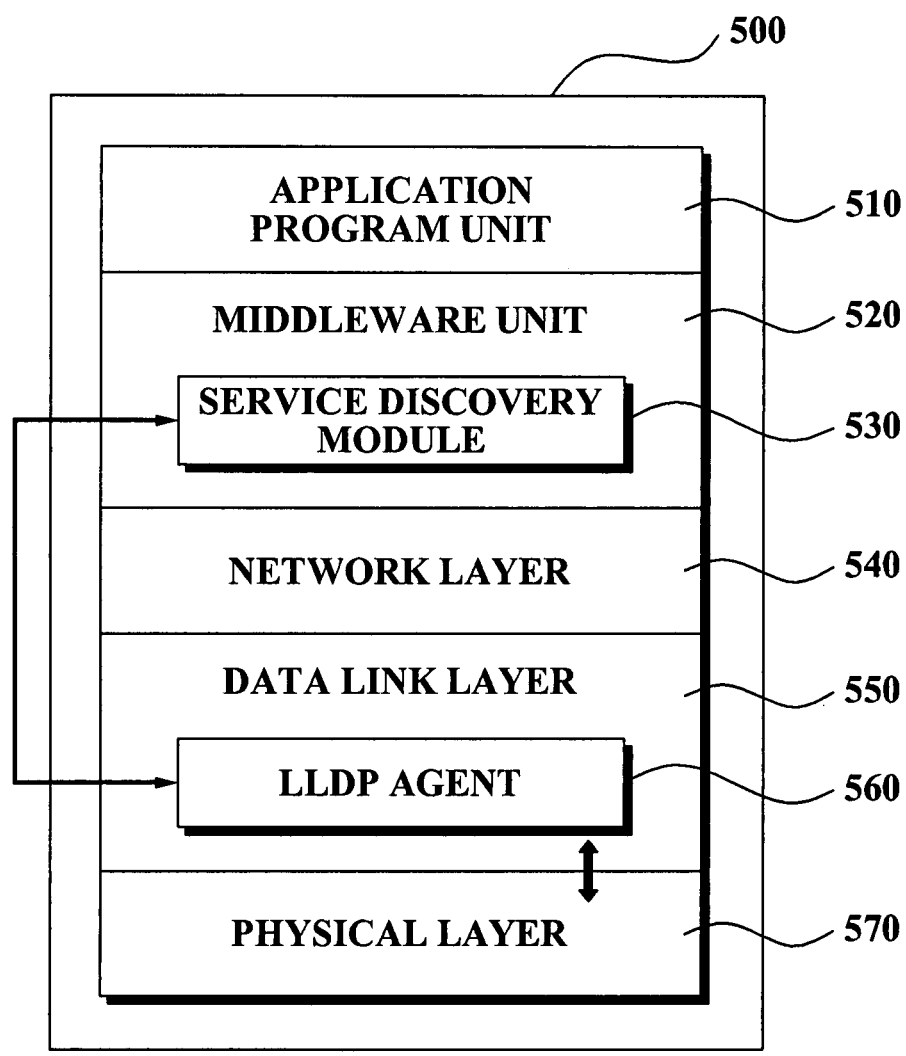
FIG. 5 is a diagram illustrating a structure of an apparatus for acquiring and transmitting a service list according to an exemplary embodiment of the present invention.

FIG. 5 is a diagram illustrating a process by which a service list acquisition apparatus 500 controls each element in order to acquire a service list according to an exemplary embodiment of the present invention.

As illustrated in FIG. 5, the service list acquisition apparatus 500 includes an application program unit 510, a middleware unit 520, a service discovery module 530, a network layer 540, a data link layer 550, a Link Layer Discovery Protocol (LLDP) agent 560, and a physical layer 570. Hereinafter, referring to FIG. 5, a function for each element is described in detail.

When a user of the service list acquisition apparatus 500 intends to use a service such as a game service, a video on demand (VOD) service, and the like, via a wireless network, the user operates the specific application program unit 510. The application program unit 510 inquires of the middleware unit 520, which performs a communication with the wireless network, whether the wireless network provides the specific service.

The middleware unit 520 checks whether the specific service list exists in the service discovery module 530 existing in the middleware unit 520. When the specific service list exists, the service discovery module 530 successively controls the network layer 540, the data link layer 550, and the physical layer 570, and the specific service is used via the wireless network.

When the specific service list does not exist as a result of the checking, the service discovery module 530 commands the LLDP agent 560 existing in the data link layer 550 to receive the specific service list without passing through the network layer 540.

The LLDP agent 560 in the data link layer 550 requests, to a service list provision apparatus via the physical layer 570, transmission of the service list. When the service list is provided, the LLDP agent 560 transmits the service list to the service discovery module 530 and enables the service list acquisition apparatus 500 to acquire the service list.

Since it is unnecessary that an IP address, required for a network layer, be allocated when message exchange for service list acquisition is performed in a data link layer, an exemplary embodiment of the present invention is more convenient than a service list acquisition method according to the related art.

Figure 6:
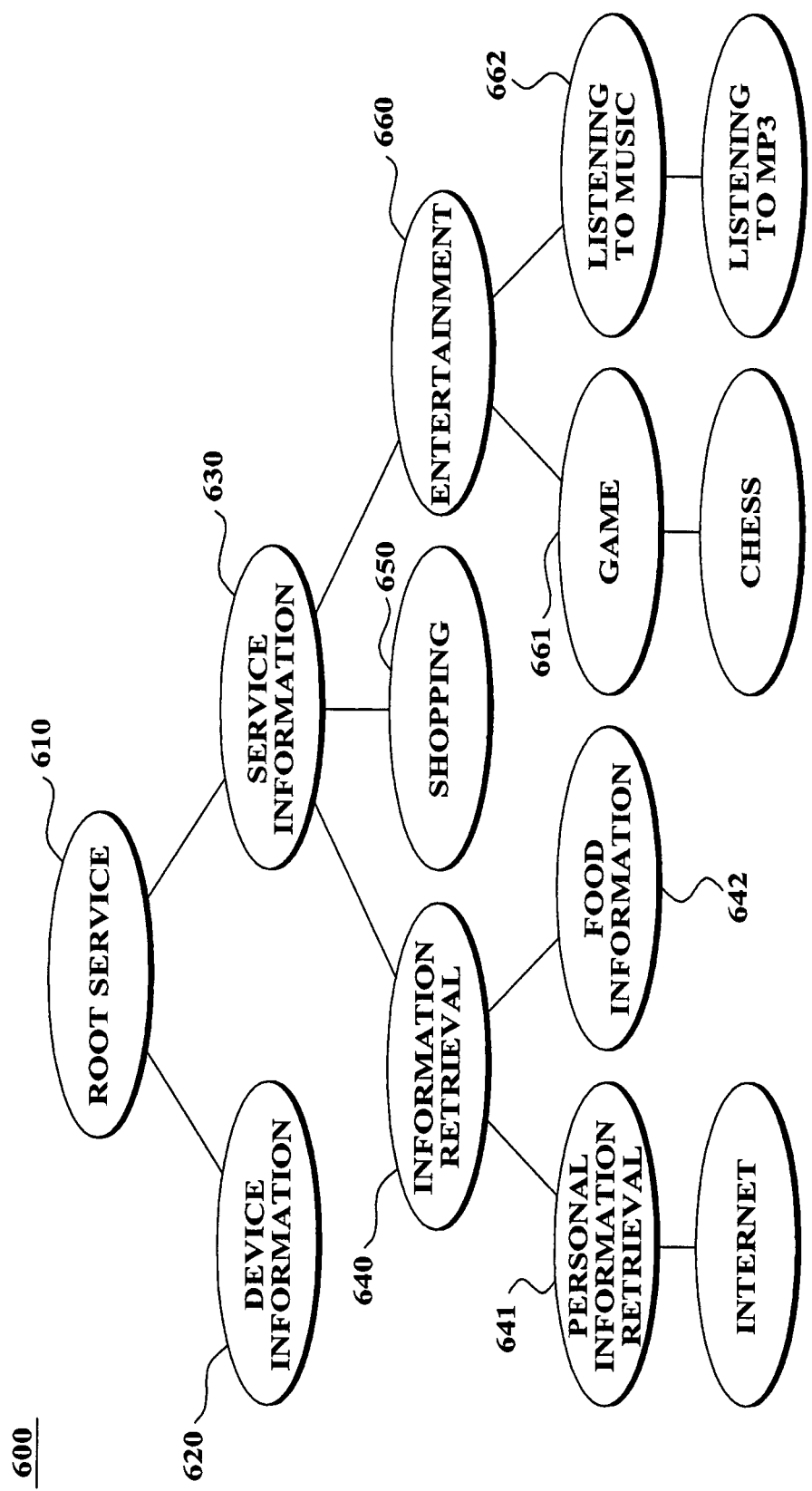
FIG. 6 is a diagram illustrating a service list in a tree structure, including a layer structure, according to an exemplary embodiment of the present invention.

FIG. 6 is a diagram illustrating a service list 600 in a tree structure including a plurality of layers according to an exemplary embodiment of the present invention. As illustrated in FIG. 6, the service list 600 tree structure comprises a plurality of layers including a root service 610 as the highest layer, and including device information 620 and service information 630 as the second layer.

The device information 620 may include at least one of system information of a service list acquisition apparatus, a device identifier of a specific device for receiving the service list and a list identifier for distinguishing between a service list, a service list request, and a service forwarding request.

The service information 630 arranges a service which a wireless network provides, into a tree structure, based on a predetermined standard. Also, FIG. 6 classifies a corresponding service into a category such as information retrieval 640, shopping 650, entertainment 660, and the like, depending on a service property. The information retrieval 640 service is reclassified into a category such as personal information retrieval 641, food information 642, and the like, depending on a service property, and respectively corresponds to a service such as Internet retrieval, restaurant retrieval, and the like. The entertainment 660 service is reclassified into a service such as game 661, listening to music 662, and the like, depending on a service property, and respectively corresponds to a service such as chess, listening to Moving Picture Experts Group Audio Layer 3 (MP3), and the like.

In an exemplary embodiment of the present invention, the service list stored or transmitted in the service list acquisition apparatus, the service list provision apparatus, and the like, may arrange all services which the network provides into the tree structure including the layer structure, however, the service list may include only service lists of a lower layer related to a specific service which a wireless network provides. For example, when the specific service corresponds to entertainment, the service list establishes entertainment 660 as the highest layer, and establishes game 661 and the listening to music 662 as lower layer.

Also, the service list may include only lists higher than or equal to a predetermined layer in the tree structure, including the plurality of layers, in order to economize a transmission speed and a storing area. For example, the service list may include the service information 630 which the wireless network provides, as the higher layer, and include only the information retrieval 640, the shopping 650, and the entertainment 660 as the lower layer. The service list may exclude personal information retrieval 641, food information 642, the game 661 and listening to music 662.

Also, the system information corresponding to the device information 620 may include a type, a shape, and a processing power information of the service list acquisition apparatus, and the like.

Figure 7:
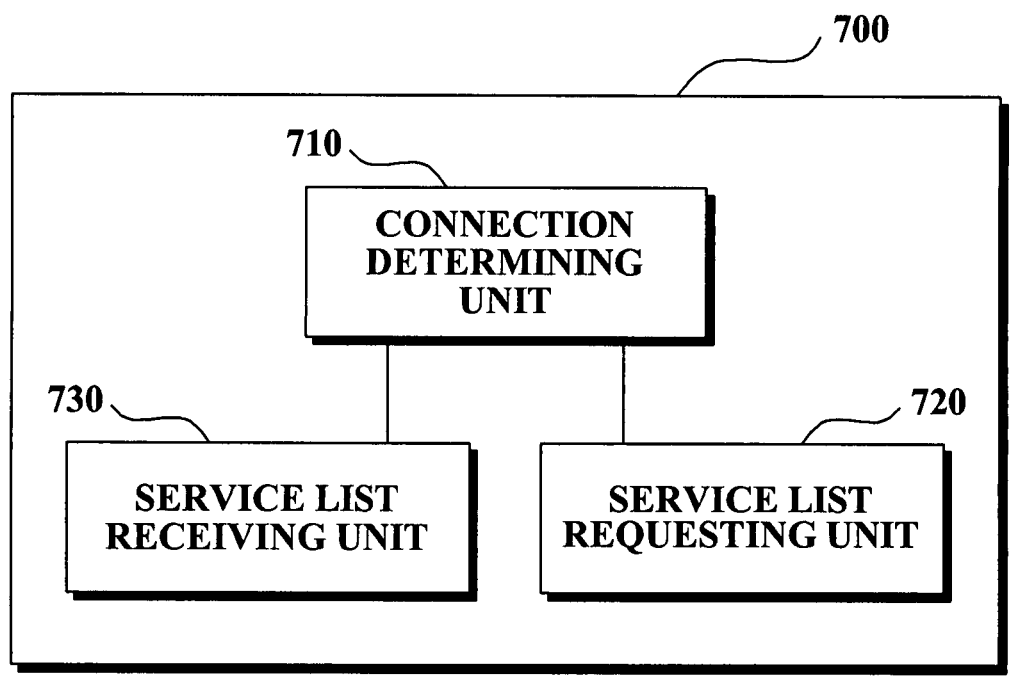
FIG. 7 is a diagram illustrating a structure of a service list acquisition apparatus according to an exemplary embodiment of the present invention.

FIG. 7 is a diagram illustrating an internal structure of a service list acquisition apparatus 700 according to an exemplary embodiment of the present invention.

As illustrated in FIG. 7, the service list acquisition apparatus 700 includes a connection determining unit 710, a service list requesting unit 720, and a service list receiving unit 730. Hereinafter, referring to FIG. 7, a function for each element is described in detail.

When a terminal intending to use a service does not have information with respect to the service which the wireless network provides, and a usage request with respect to the specific service does not exist, the connection determining unit 710 requests a service list with respect to a general service which the wireless network provides. When the terminal has a portion of the service list which the wireless network provides, but wherein the specific service which the terminal intends to currently use does not exist in the service list, the connection determining unit 710 requests the service list with respect to the specific service.

The service list requesting unit 720 transmits a service list request to a surrounding service list provision apparatus according to the above-described command. When the service list requesting unit 720 exists in a lower layer of an IP layer, the IP address need not be allocated in order to transmit the service list request to the service list provision apparatus. Therefore, unnecessary network traffic generation for IP address allocation is prevented when the service list transmission request should be repeatedly transmitted since an incorrect service list is received, or the service list is not received.

The service list receiving unit 730 receives the service list transmitted from the service list provision apparatus, and transmits the service list to the connection determining unit 710.

The connection determining unit 710 compares the received service list and a service which it intends to use, and determines whether to stop transmitting the service list request and connect with the network which the service provides, or whether to continue transmitting the service list request.

When the service list which the service list receiving unit 730 receives includes only lists higher than or equal to a predetermined layer with respect to the specific service, excluding the lower entire lists of the specific service which the service list acquisition apparatus intends to acquire, the connection determining unit 710 may command the service list requesting unit 720 to continue transmitting the service list request so that another service list provision apparatus, besides the service list provision apparatus transmitting the service list, may receive the service list transmission request, or to transmit a service list forwarding request which requests that the service list provision apparatus is operated as a service list forwarding apparatus.

Also, the connection determining unit 710 may perform the service list forwarding request when only the service list is in the same layer or a layer higher than the predetermined layer, and excludes all lower service lists with respect to the specific service received in response to the service list request, or when the service list is not received.

When the received service list is different from the specific service which the service list acquisition apparatus 700 intends to acquire, the connection determining unit 710 may command the service list requesting unit 720 to request the service list with respect to the specific service or a list with respect to services higher than the specific service again.

When the received service list is different from the specific service which the service list acquisition apparatus 700 intends to acquire, the connection determining unit 710 may command the service list requesting unit 720 to transmit the service list forwarding request requesting that the service list request with respect to the specific service should be forwarded to the other service list provision apparatus.

Figure 8:
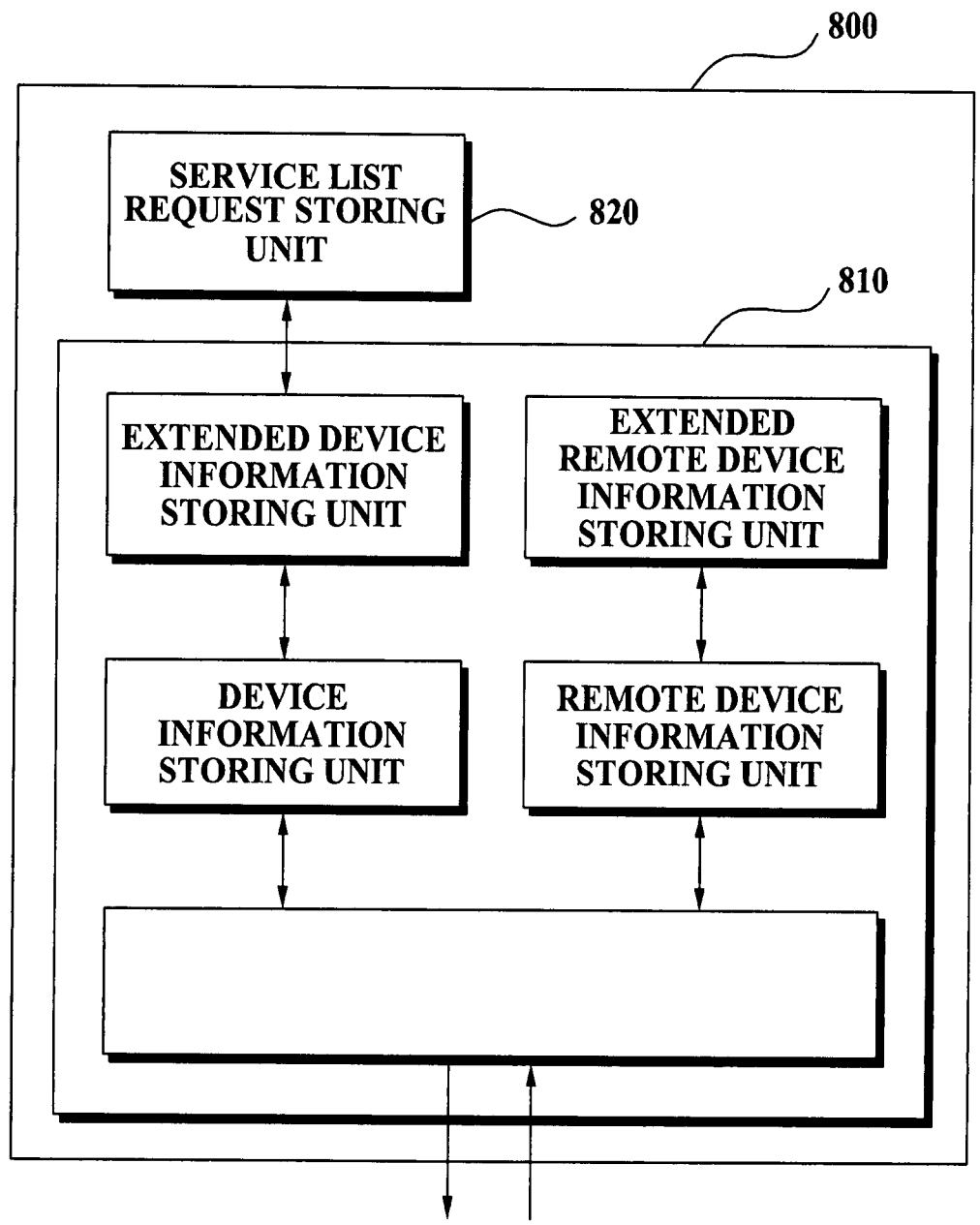
FIG. 8 is a diagram illustrating a new agent structure for improving an LLDP agent used as a service list requesting unit in a service list acquisition apparatus according to an exemplary embodiment of the present invention.

FIG. 8 is a diagram illustrating a structure of a service list requesting unit 800 which is embodied modifying a conventional LLDP agent according to an exemplary embodiment of the present invention. As illustrated in FIG. 8, a service list request storing unit 820 corresponding to a service request management information base (MIB) is added to a conventional LLDP agent structure 810, in the LLDP agent.

When the service list, which the service discovery module existing in the higher layer intends to discover, is stored in the service list request storing unit 820 of the modified LLDP agent, the modified LLDP agent transmits the service list to the service list provision apparatus.

The LLDP agent may repeatedly transmit the service list request stored in the service list request storing unit 820, depending on establishment of the connection determining unit without another command.

Also, even when entire service lists with respect to the specific service are stored, the service list request including only the service list in the same layer or a layer higher than the predetermined layer may be transmitted to the service list provision apparatus in order to reduce a length of a packet transmitted to an outside.

Figure 9:
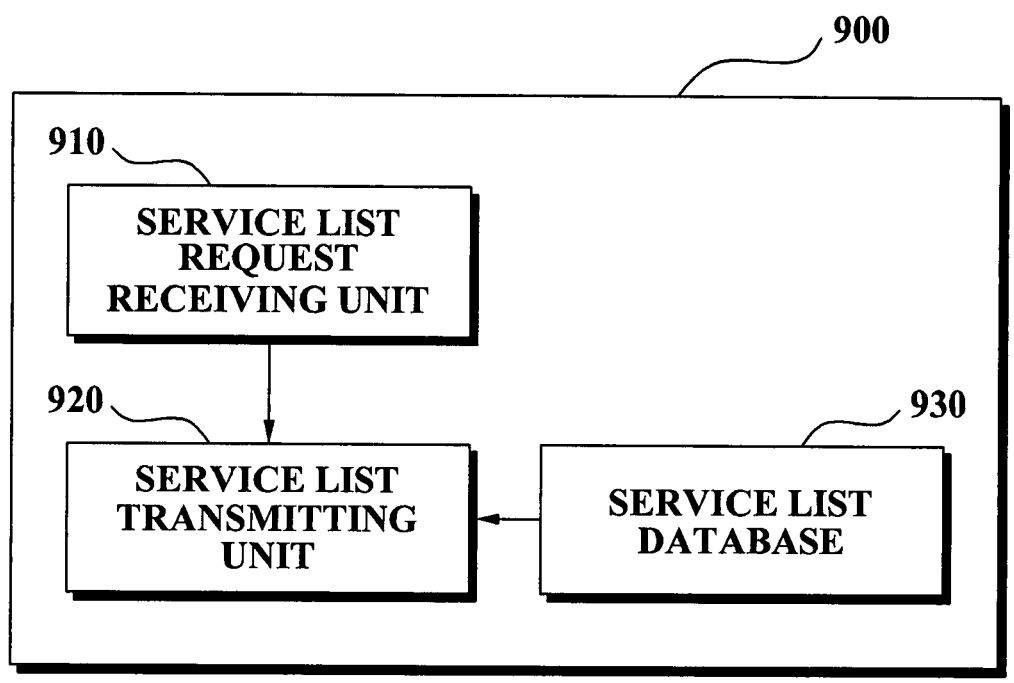
FIG. 9 is a diagram illustrating a structure of a service list provision apparatus according to an exemplary embodiment of the present invention.

FIG. 9 is a diagram illustrating an internal structure of a service list provision apparatus 900 according to an exemplary embodiment of the present invention. As illustrated in FIG. 9, the service list provision apparatus 900 includes a service list request receiving unit 910, a service list transmitting unit 920, and a service list database 930. Hereinafter, referring to FIG. 9, a function for each element is described in detail.

The service list request receiving unit 910 receives a service list request transmitted from a service list acquisition apparatus, and the service list transmitting unit 920 identifies, from the service list database 930, the service list corresponding to the received service list request and transmits the identified service list to the service list acquisition apparatus.

The service list provision apparatus transmits the service list to the service list acquisition apparatus, and increases a transmission bandwidth with respect to the service list when the service list corresponding to the received service list request is stored in the service list database 930, thereby reducing a period of time required for transmission.

The service list transmitting unit 920 may transmit, to the service list acquisition apparatus, a re-searching command with respect to the service list storing unit in the service list acquisition apparatus when the service list corresponding to the received service list request is not stored in the service list database 930. When the service list transmitting unit 920 is located in a layer lower than an IP layer, the service list acquisition apparatus may easily transmit the service list, although the IP address is not allocated to the service list acquisition apparatus so that the service list transmitting unit 920 may transmit the re-searching command to the service list acquisition apparatus.

When the received service list request is a service list request with respect to a general service which the network provides, the service list transmitting unit 920 may select only the service appropriate for the service list acquisition apparatus from among the service lists stored in the service list database 930 considering the system information of the service list acquisition apparatus, which is included in the service list request, and transmit only the reconfigured service list to the service list acquisition apparatus. Here, the system information of the service list acquisition apparatus may include at least any one of a terminal type, existence of a display unit, a form of an input apparatus, and processing power information. For example, when the service list acquisition apparatus has less processing power than a movie to be replayed requires, or does not have a display unit, or has only significantly small display unit, the service list provision apparatus may delete the service list with respect to movie streaming which the network provides and transmit only other services.

Figure 10:
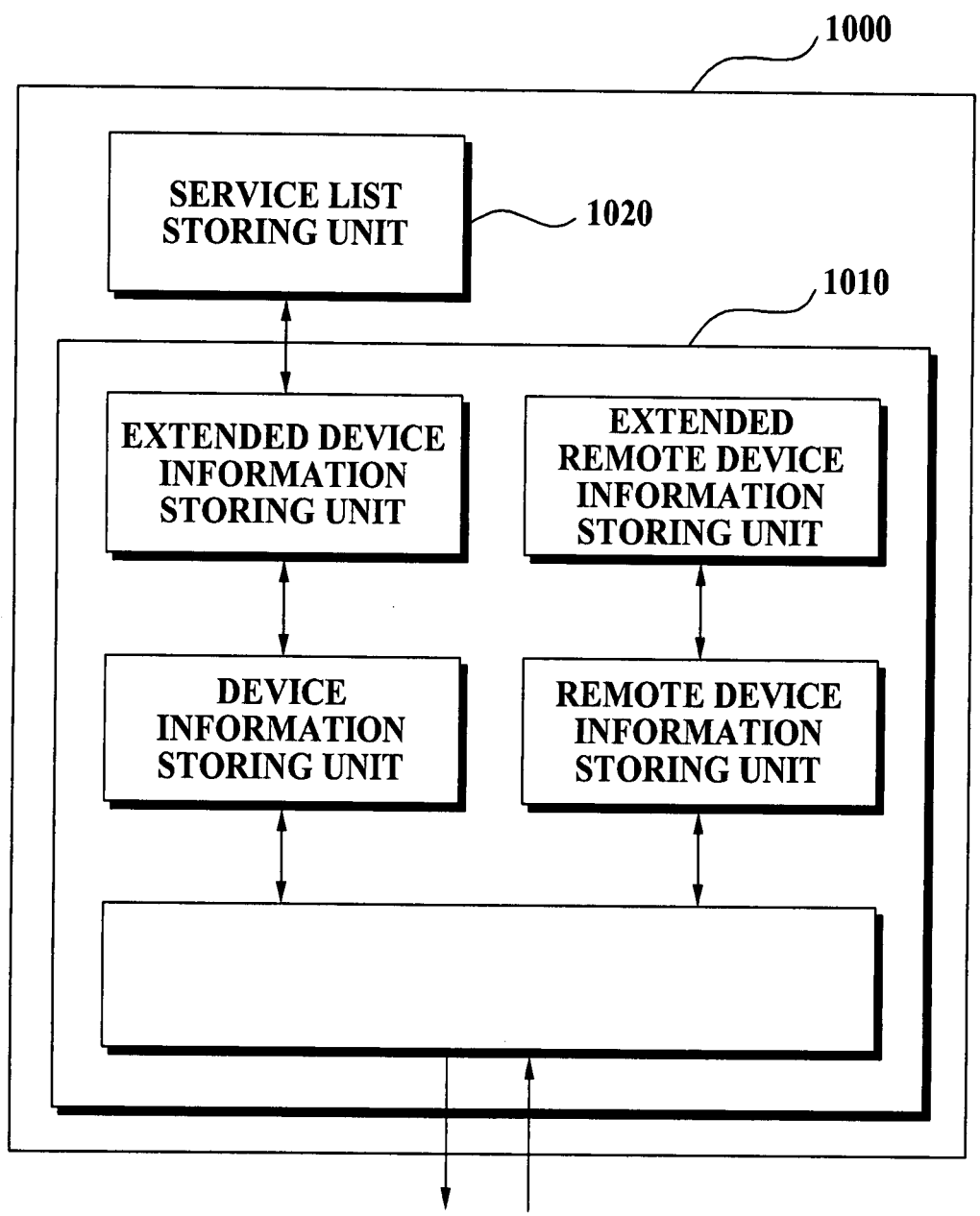
FIG. 10 is a diagram illustrating a new agent structure of improving an LLDP agent used as a service list transmitting unit in a service list provision apparatus according to an exemplary embodiment of the present invention.

FIG. 10 is a diagram illustrating a structure of a service list transmitting unit 1000 which is embodied modifying a conventional LLDP agent according to an exemplary embodiment of the present invention. As illustrated in FIG. 10, a service list storing unit 1020 corresponding to a service advertisement MIB is added to a conventional LLDP structure 1010, in the LLDP agent. Hereinafter, referring to FIG. 10, a function for each element is described in detail.

When all lower service lists or the service list with respect to the specific service at the same layer or a layer higher than a predetermined layer, which exists in the service list provision apparatus, is stored in the service list storing unit 1020 of the modified the LLDP agent, the LLDP agent transmits the service list to the service list acquisition apparatus. Although the entire lower service lists with respect to the specific service which the service list acquisition apparatus intends to acquire may be stored depending on the storing area, only the service list with respect to the specific service at the same layer or a layer higher than the predetermined layer may be stored.

The LLDP agent may repeatedly and periodically transmit the service list stored in the service list storing unit 1020.

Figure 11:
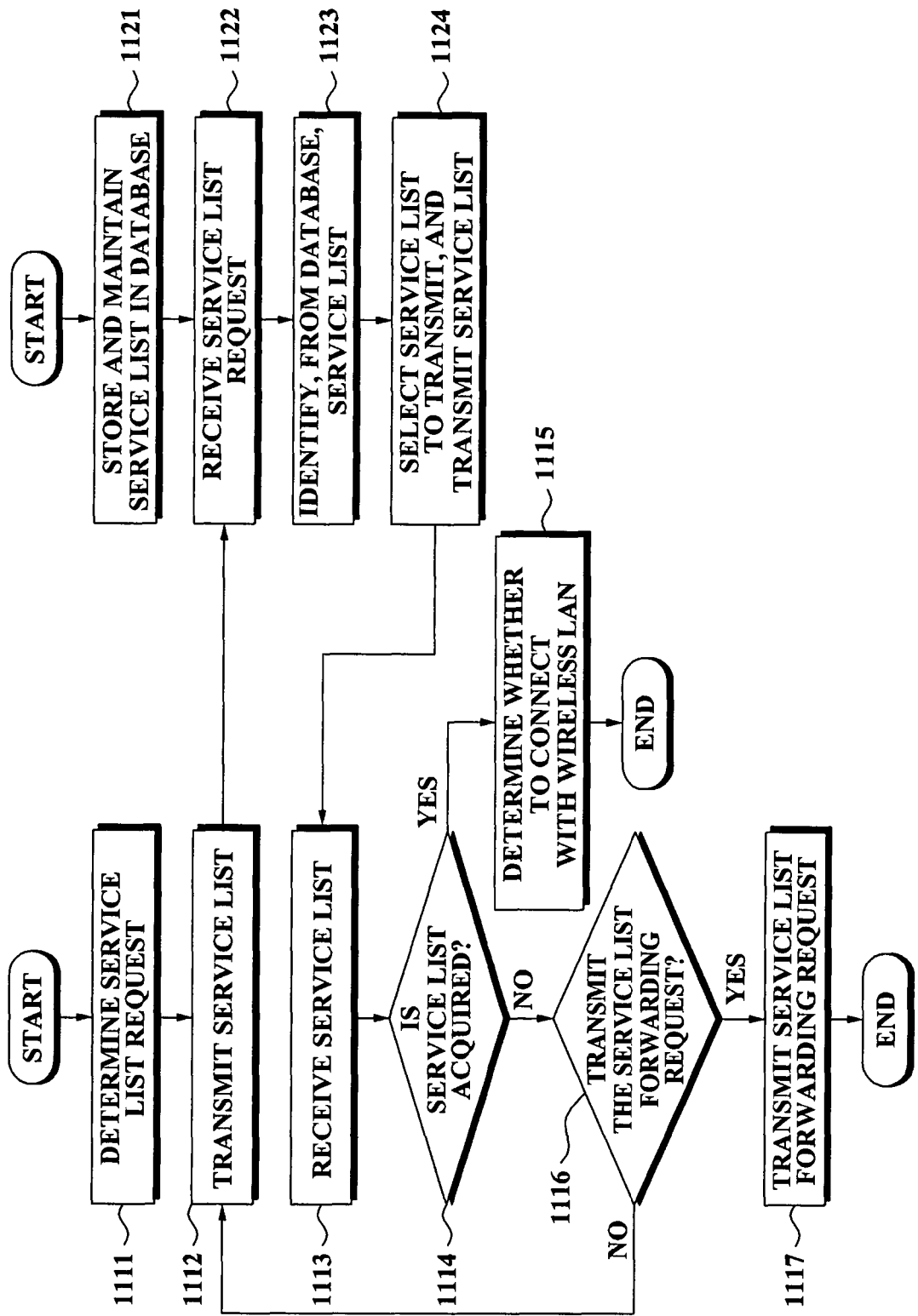
FIG. 11 is a flowchart illustrating an operation of a service list acquisition apparatus and an operation of a service list provision apparatus according to an exemplary embodiment of the present invention.

FIG. 11 is a flowchart illustrating an operation of a service list acquisition apparatus and an operation of a service list provision apparatus according to an exemplary embodiment of the present invention. Hereinafter, referring to FIG. 11, a function for each step is described in detail.

In step 1111, the service list acquisition apparatus determines whether to perform a service list request in order to receive, from the service list provision apparatus, a service list which a wireless network provides. The service list acquisition apparatus determines whether the service which the service list acquisition apparatus intends to use is included in the service list which the wireless network provides, or whether the service list provision apparatus has the service list which the wireless network provides.

In step 1112, the service list request is transmitted to the service list provision apparatus. The service list request may include system information of the service list acquisition apparatus and the service list in a tree form, including a layer structure which is related to a specific service it intends to use.

In step 1121, the service list provision apparatus acquires, stores, and maintains in a service list database the entire or partial service list which the wireless network provides.

In step 1122, the service list provision apparatus receives the service list request which the service list acquisition apparatus transmits.

In step 1123, the service list provision apparatus determines whether the corresponding service exists, comparing the service list the wireless network provides, which is stored in the service list database of the service list provision apparatus, and the service list of the received service list request. In step 1124, the service list provision apparatus selects only the service which the service list acquisition apparatus may use considering the system information of the service list acquisition apparatus, which is included in the received service list request, and reconfigures the service list to transmit to the service list acquisition apparatus into the tree form including the layer structure. Also, the service list provision apparatus transmits the reconfigured service list to the service list acquisition apparatus.

In step 1113, the service list acquisition apparatus receives the service list which the service list provision apparatus transmits.

In step 1114, the service list acquisition apparatus determines whether the service list with respect to the service which the service list acquisition apparatus intends to use is successfully acquired.

When the service list is successfully acquired, a service list acquisition procedure is stopped, and whether to connect with a wireless local area network (LAN) is determined, in step 1115.

When the service list is not successfully acquired, the service list acquisition apparatus determines whether to transmit the service list forwarding request, in step 1116.

When the service list acquisition apparatus determines to transmit the service list forwarding request, the service list forwarding request is transmitted, in step 1117.

When the service list acquisition apparatus determines not to transmit the service list forwarding request, the service list acquisition apparatus waits for the service list from a second service list provision apparatus, and transmits the service list request again, in step 1112.

Since a configuration of the service list acquisition apparatus and the service list provision apparatus described in FIGS. 5 through 10 may be applied to the service list acquisition method and the service list provision method in FIG. 11, hereinafter, a detailed description thereof is omitted.

Figure 12:
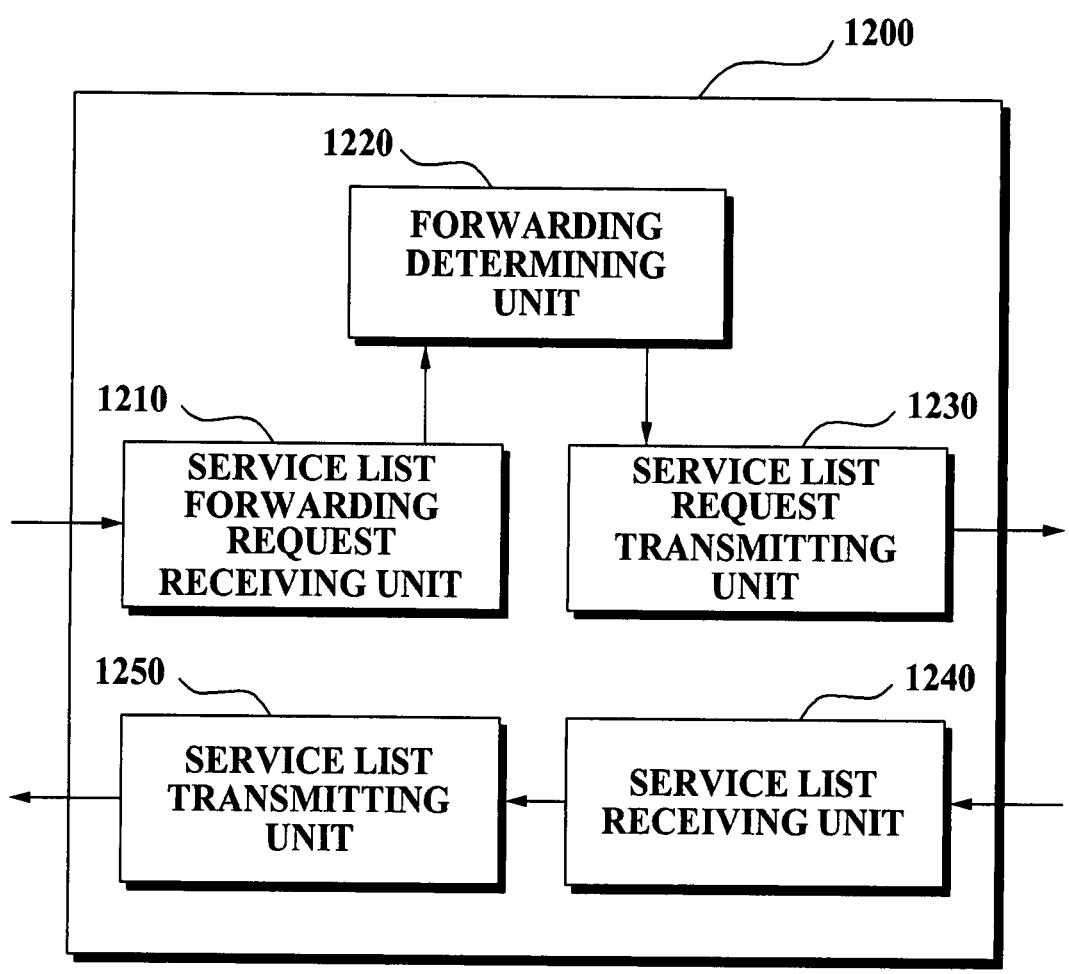
FIG. 12 is a diagram illustrating a structure of a service list forwarding apparatus according to an exemplary embodiment of the present invention.

FIG. 12 is a block diagram illustrating an internal structure of a service list forwarding apparatus according to an exemplary embodiment of the present invention. As illustrated in FIG. 12, a service list forwarding apparatus 1200 includes a service list forwarding request receiving unit 1210, a forwarding determining unit 1220, a service list request transmitting unit 1230, a service list receiving unit 1240, and a service list transmitting unit 1250. Hereinafter, referring to FIG. 12, a function for each element is described in detail.

The service list forwarding request receiving unit 1210 receives a service list forwarding request from a service list acquisition apparatus and transmits the service list forwarding request to the forwarding determining unit 1220.

The forwarding determining unit 1220 determines whether to perform service list forwarding for the specific service list acquisition apparatus when the service list forwarding request is received from the specific service list acquisition apparatus or when the specific service list acquisition apparatus continuously performs the service list transmission request.

When the received service list forwarding request includes a device identifier corresponding to a specific device to be operated as the service list forwarding apparatus, the service list forwarding apparatus compares the device identifier of the service list forwarding apparatus, and the received device identifier and does not perform the service list forwarding when the device identifiers are different.

When the forwarding determining unit 1220 determines to perform the service list forwarding, the service list request transmitting unit 1230 extracts the service list with respect to the specific service in the received service list forwarding request, and transmits the service list to a service list provision apparatus.

The service list receiving unit 1240 receives the service list from the service list provision apparatus, and the service list transmitting unit 1250 transmits the service list to the service list acquisition apparatus.

When the service list request transmitting unit 1230 and the service list transmitting unit 1250 exist in a layer lower than an IP layer, the service list request and the service list may be easily transmitted although an IP address is not allocated.

In particular, the service list forwarding is effectively used when the service list forwarding apparatus excludes the entire service lists which the wireless network provides or the entire lower service lists with respect to the specific service, and both the service list forwarding apparatus and a surrounding service list provision apparatus respectively have the service list.

Figure 13:
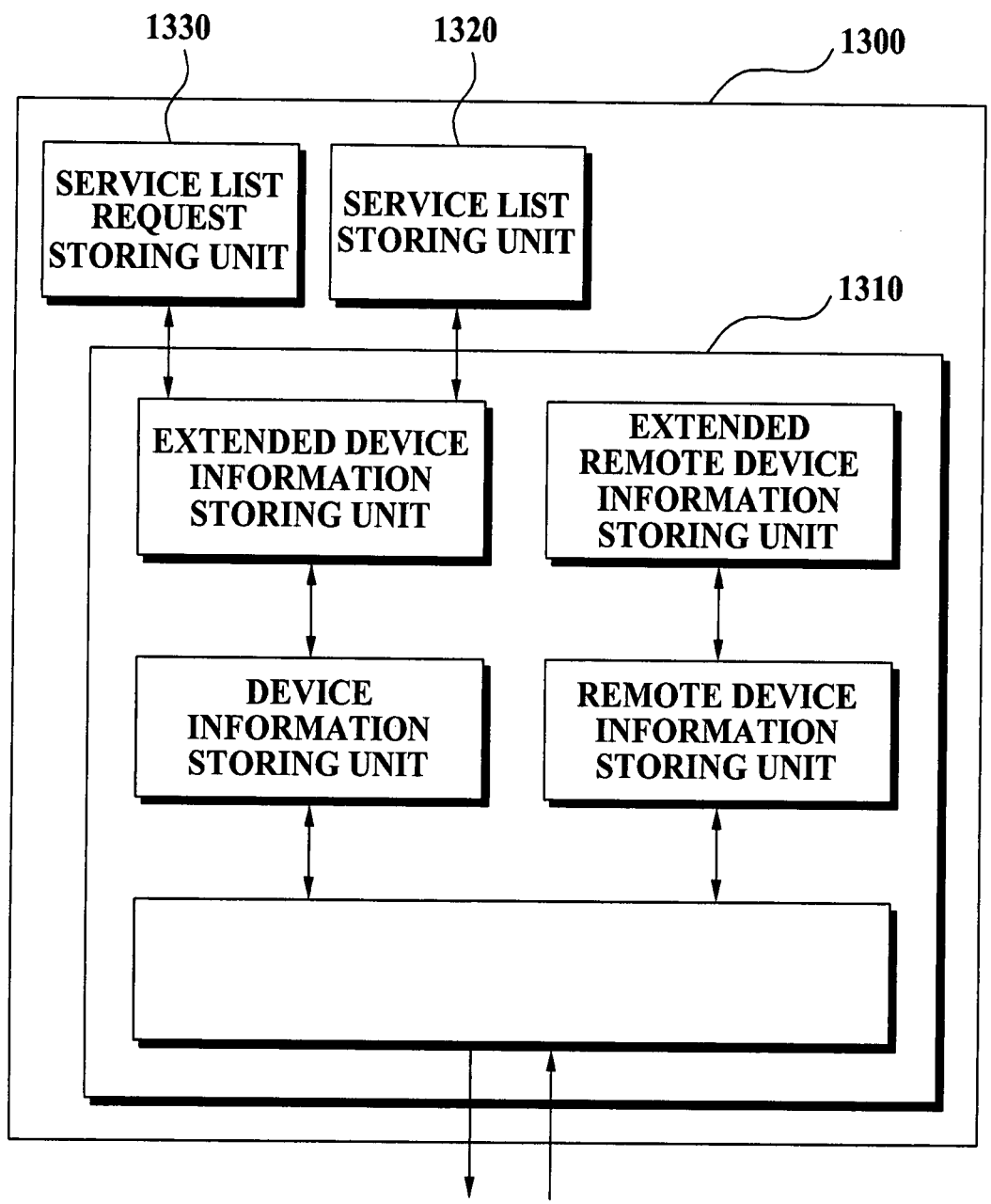
FIG. 13 is a diagram illustrating a new agent structure of improving an LLDP agent used as a service list forwarding unit and a service list transmitting unit in a service list forwarding apparatus according to an exemplary embodiment of the present invention.

FIG. 13 is a diagram illustrating a structure 1300 of a service list request transmitting unit and a service list transmitting unit, which is embodied modifying a conventional LLDP agent according to an exemplary embodiment of the present invention. As illustrated in FIG. 13, a service list request storing unit 1330 corresponding to a service proxy MIB, and a service list storing unit 1320 corresponding to a service advertisement MIB are added to a conventional LLDP structure 1310 in the LLDP agent.

When a service forwarding determining unit determines to be operated as a service forwarding apparatus, the LLDP agent stores a service list request included in the received service list forwarding request in the service list request storing unit 1330, and transmits the service list request to a service list provision apparatus.

When the service list forwarding apparatus receives the service list, the service list is stored in the service list storing unit 1320 and the LLDP agent transmits the service list to a service list acquisition apparatus.

Figure 14:
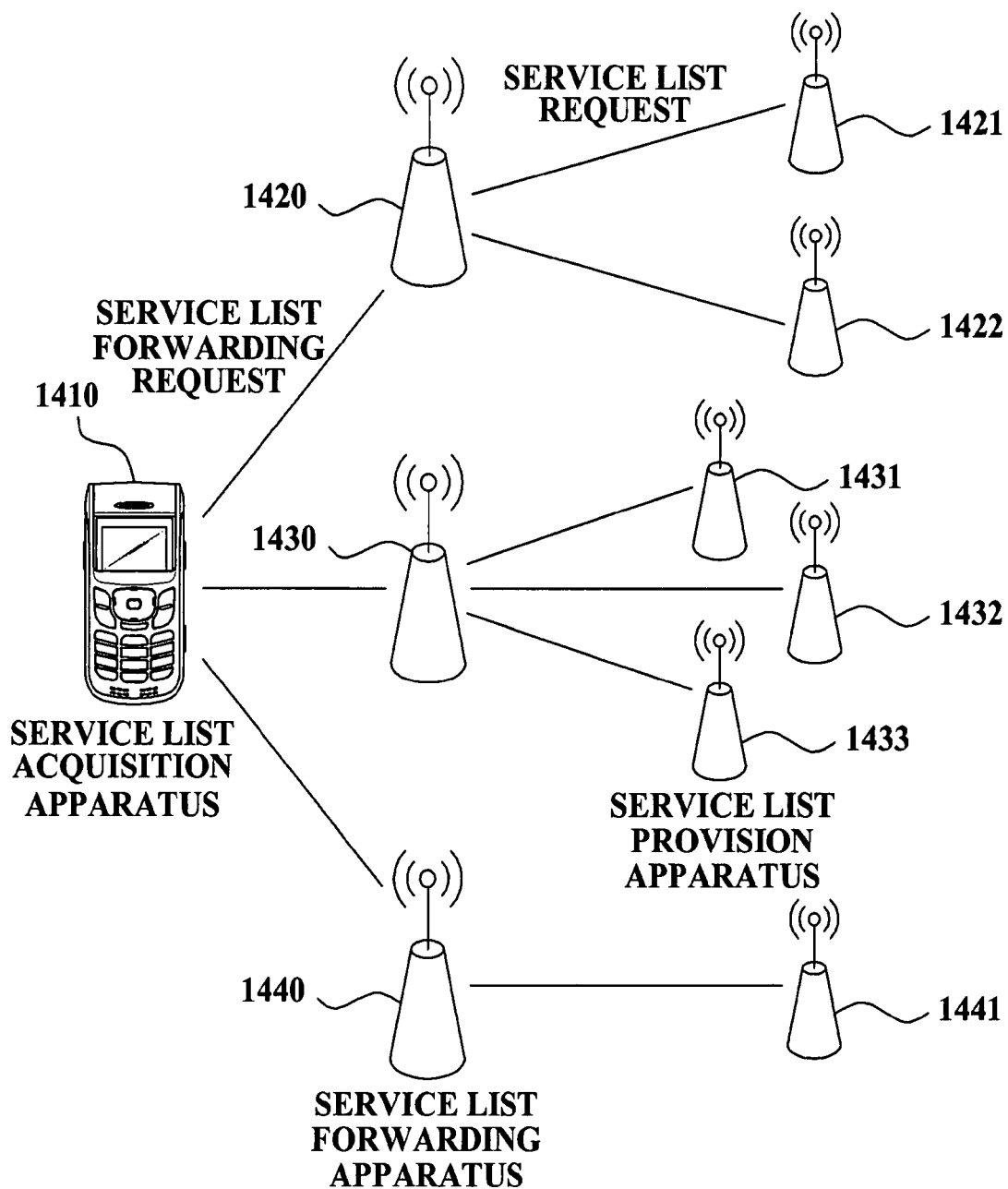
FIG. 14 is a diagram illustrating a case in which a plurality of service list forwarding apparatuses performs service list forwarding in response to a service list forwarding request of one service list acquisition apparatus according to an exemplary embodiment of the present invention.

FIG. 14 is a diagram illustrating an exemplary embodiment wherein a plurality of service list forwarding apparatuses perform service list forwarding in response to a service list forwarding request of one service list acquisition apparatus according to an exemplary embodiment of the present invention. As illustrated in FIG. 14, since a plurality of service list forwarding apparatuses 1420, 1430, and 1440 may be operated in response to the service list forwarding request, and each service list forwarding apparatus may receive the service list from a plurality of service list provision apparatuses 1421, 1422, 1431, 1432, 1433, and 1441 when only one service list acquisition apparatus 1410 transmits the service list forwarding request, unnecessary traffic may be generated in the entire network in the above-described case. Accordingly, it is desirable that the forwarding determining unit of the service list forwarding apparatus should determine to perform the service list forwarding exclusively when there is confidence that the service list forwarding does not cause excessive traffic in the entire network.

The service list acquisition apparatus may transmit the service list forwarding request including qualification information in order to be confident that the service list forwarding of the service list forwarding apparatus does not cause excessive traffic in the entire network. Also, when the service list forwarding apparatus checks the qualification information, the service list acquisition apparatus should forward the service list from another service list provision apparatus in response to the service list forwarding request.

The service list forwarding request which the service list acquisition apparatus transmits may be transmitted at a speed less than or equal to the highest speed at which the service list acquisition apparatus may transmit the service list forwarding request.

Additional traffic amount of the service list forwarding apparatus and the service list provision apparatus is less than or equal to a traffic amount which is expected to be allocated to the service list acquisition apparatus, or which is expected that the service list acquisition apparatus causes. When the plurality of service list forwarding apparatuses is used, a description related thereto is similarly applied to each service list forwarding apparatus.

Figure 15:
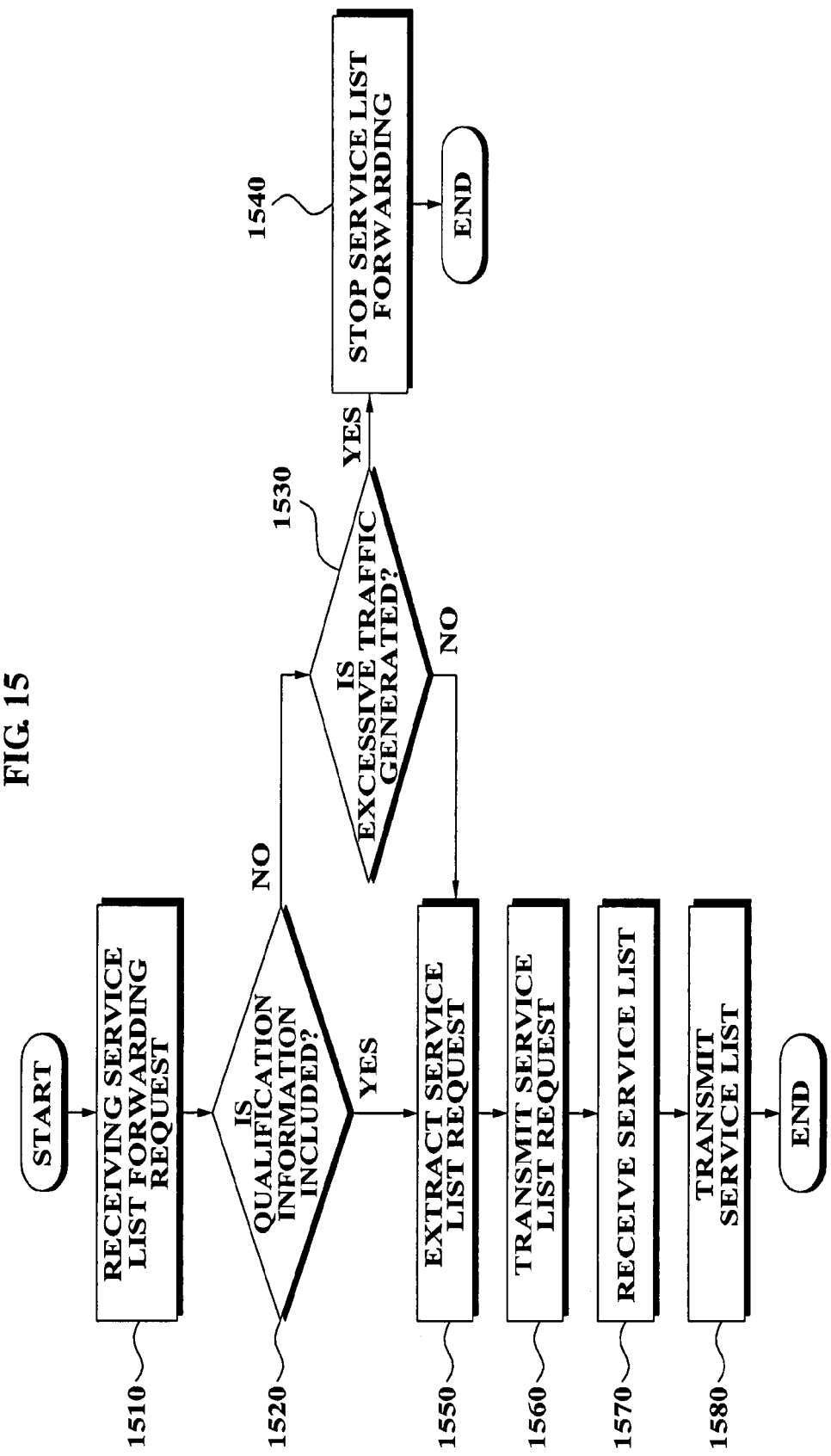
FIG. 15 is a flowchart illustrating an operation of a service list forwarding apparatus.

FIG. 15 is a flowchart illustrating an operation of a service list forwarding apparatus. Hereinafter, referring to FIG. 15, a function for each step is described in detail.

In step 1510, the service list forwarding apparatus receives the service list forwarding request from the service list acquisition apparatus or another service list forwarding apparatus.

In step 1520, the service list forwarding apparatus determines whether qualification information is included in the received service list forwarding request.

When qualification information is excluded from the received service list forwarding request, the service list forwarding apparatus determines whether service list forwarding of the service list forwarding apparatus generates excessive traffic in a wireless network, in step 1530.

When the service list forwarding apparatus determines that a service list forwarding procedure generates excessive traffic, as a result of the determining, the service list forwarding procedure is stopped, in step 1540.

When qualification information is included, as a result of the determining in step 1520, or the service list forwarding apparatus determines that the service list forwarding procedure does not generate excessive traffic in the entire network in step 1530, the service list request is extracted from the received service list forwarding request for the service list forwarding, in step 1550.

In step 1560, the extracted service list request is transmitted to a service list provision apparatus.

In step 1570, the service list is received from the service list provision apparatus.

In step 1580, the received service list is transmitted to the service list acquisition apparatus or the service list forwarding apparatus.

According to exemplary embodiments of the present invention, it is possible to transceive a message in a data link layer without a complex IP address allocation process, and efficiently perform a process of receiving a service list which a wireless network provides.

Also, according to exemplary embodiments of the present invention, it is possible to improve efficiency of an entire network without generating unnecessary network traffic for allocating an IP address.

The present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While the invention has been shown and described with reference to certain exemplary embodiments thereof, it will be understood by those skilled in the art that various changes in form and details may be made therein without departing from the spirit and scope of exemplary embodiments of the present invention as defined by the appended claims and their equivalents.

What is claimed is:

1. A service list acquisition apparatus configured to acquire, from at least one terminal located in a wireless network coverage area, a service list that a wireless network provides, the apparatus comprising:
    a service list requesting unit configured to transmit a service list request with respect to a specific service to the at least one terminal;
    when the at least one terminal stores the service list, a service list receiving unit configured to receive the service list from the at least one terminal with an increased transmission bandwidth; and
    a connection determining unit configured to determine whether the wireless network is connected based on the received service list,
    wherein the service list request includes system information of the service list acquisition apparatus, and
    wherein the system information includes a type of the service list acquisition apparatus, an existence of a display unit of the service list acquisition apparatus, a form of an input apparatus of the service list acquisition apparatus, and a processing power information of the service list acquisition apparatus.

2. The apparatus of claim 1, wherein the service list requesting unit is located in a layer that is lower than a predetermined layer of an Internet protocol (IP) layer in the service list acquisition apparatus.

3. The apparatus of claim 1, wherein the connection determining unit determines whether a predetermined service is included in the received service list, and
    the service list requesting unit transmits a second service list request to the at least one terminal when the predetermined service is excluded from the received service list, as a result of the determining.

4. The apparatus of claim 1, wherein the service list request includes a terminal identifier to identify the at least one terminal.

5. The apparatus of claim 1, wherein the service list includes only lists in the same layer or in a layer higher than a predetermined layer in a tree structure.

6. The apparatus of claim 1, wherein the service list includes a service list of a lower layer related to the specific service in a tree structure.

7. The apparatus of claim 1, wherein the service list is determined depending on the system information.

8. The apparatus of claim 7, wherein the system information includes at least one from among a type, a shape, and a processing power information of the service list acquisition apparatus.

9. The apparatus of claim 1, wherein the service list request is a transmission request of the service list with respect to the specific service.

10. The apparatus of claim 1, wherein the service list requesting unit transmits to the at least one terminal a forwarding request with respect to the service list request when the received service list is different from the service list request.

11. A service list provision apparatus configured to provide, from at least one terminal located in a wireless network coverage area, a service list that a wireless network provides, the apparatus comprising:
    a database configured to store the service list;
    a service list request receiving unit configured to receive a service list request from a first terminal, and receive a forwarding request with respect to the service list request from the first terminal;

a service list transmitting unit configured to identify, from the database, the service list corresponding to the service list request, and transmit the identified service list to the first terminal, wherein the service list transmitting unit increases a transmission bandwidth with respect to the service list when the service list corresponding to the service list request is stored in the database; and a forwarding transmitting unit configured to transmit the received forwarding request to a second terminal when the forwarding request includes qualification information indicating that forwarding of the service list does not cause excessive traffic in the wireless network, wherein the service list transmitting unit determines the transmission of the forwarding request by considering a reliability of the wireless network with respect to the at least one terminal.

12. The apparatus of claim 11, wherein the service list transmitting unit is located in a layer that is lower than a predetermined layer of an IP layer in the service list provision apparatus.

13. The apparatus of claim 11, wherein the service list transmitting unit transmits a re-searching command with respect to the service list stored in the at least one terminal when the service list corresponding to the service list request is not stored in the database.

14. The apparatus of claim 11, further comprising a service list receiving unit configured to receive the service list from the second terminal.

15. The apparatus of claim 14, wherein the forwarding transmitting unit repeatedly transmits the forwarding request.

16. The apparatus of claim 14, wherein the forwarding request includes a terminal identifier with respect to the at least one terminal configured to forward the service list.

17. The apparatus of claim 14, wherein the service list transmitting unit determines whether to transmit the forwarding request by considering a load of the wireless network with respect to the forwarding request.

18. A service list acquisition method to acquire, from at least one terminal located in a wireless network coverage area, a service list that a wireless network provides, the method comprising the steps of:

transmitting a service list request with respect to a specific service to the at least one terminal;

when the at least one terminal stores the service list, receiving the service list from the at least one terminal with an increased bandwidth; and determining whether to connect with the wireless network based on the received service list, wherein the service list request includes system information of a service list acquisition apparatus, and wherein the system information includes a type of the service list acquisition apparatus, an existence of a display unit of the service list acquisition apparatus, a form of an input apparatus of the service list acquisition apparatus, and a processing power information of the service list acquisition apparatus.

19. A service list provision method to provide, from at least one terminal located in a wireless network coverage area, a service list that a wireless network provides, the method comprising the steps of:

storing and maintaining the service list in a database;

receiving a service list request from a first terminal;

receiving a forwarding request with respect to the service list request from the first terminal;

identifying, from the database, the service list corresponding to the service list request;

increasing a transmission bandwidth with respect to the service list;

transmitting the identified service list to the first terminal;

transmitting the received forwarding request to a second terminal when the forwarding request includes qualification information indicating that forwarding of the service list does not cause excessive traffic in the wireless network; and determining the transmission of the forwarding request by considering a reliability of the wireless network with respect to the at least one terminal.

20. A non-transitory computer-readable recording medium storing a program to acquire, from at least one terminal located in a wireless network coverage area, a service list that a wireless network provides, comprising:

a first set of instructions to transmit a service list request with respect to a specific service to the at least one terminal;

a second set of instructions to receive the service list from the at least one terminal with an increased transmission bandwidth when the at least one terminal stores the service list; and a third set of instructions to determine whether to connect with the wireless network based on the received service list, wherein the service list request includes system information of a service list acquisition apparatus, and wherein the system information includes a type of the service list acquisition apparatus, an existence of a display unit of the service list acquisition apparatus, a form of an input apparatus of the service list acquisition apparatus, and a processing power information of the service list acquisition apparatus.

21. A non-transitory computer-readable recording medium storing a program to provide, from at least one terminal located in a wireless network coverage area, a service list that a wireless network provides, comprising:

a first set of instructions to store and maintain the service list in a database;

a second set of instructions to receive a service list request from a first terminal, and receive a forwarding request with respect to the service list request from the first terminal;

a third set of instructions to identify, from the database, the service list corresponding to the service list request;

a fourth set of instructions to increase a transmission bandwidth, and transmit the identified service list to the first terminal;

a fifth set of instructions to transmit the received forwarding request to a second terminal when the forwarding request includes qualification information indicating that forwarding of the service list does not cause excessive traffic in the wireless network; and a sixth set of instructions to determine the transmission of the forwarding request by considering a reliability of the wireless network with respect to the at least one terminal.

22. The apparatus of claim 1, wherein the service list requesting unit transmits at least one of a second service list request and a service list forwarding request to the at least one terminal when the service list includes only one or more lists higher than or equal to a predetermined layer with respect to the specific service.

23. The apparatus of claim 1, wherein:
the service list includes a tree structure including a plurality of layers; and
the service list requesting unit transmits a second service list request with respect to a higher layer service than the specific service to the at least one terminal when the specific service is different from the received service list.

\* \* \* \* \*